United States Patent [19]
Ogihara

[11] Patent Number: 4,489,031
[45] Date of Patent: Dec. 18, 1984

[54] METHOD FOR MOLDING PLASTIC MATERIAL BY MECHANICAL PRESS

[75] Inventor: Susumu Ogihara, Hachioji, Japan

[73] Assignee: Susumu Ogihara, Sagamihara, Japan

[21] Appl. No.: 450,557

[22] Filed: Dec. 16, 1982

[30] Foreign Application Priority Data

Feb. 22, 1982 [JP]  Japan ............................. 57-27580

[51] Int. Cl.³ .............................................. B29C 3/00
[52] U.S. Cl. ................................... 264/294; 264/319; 264/325
[58] Field of Search ............... 264/294, 319, 320, 322, 264/325

[56] References Cited

U.S. PATENT DOCUMENTS

| | | | |
|---|---|---|---|
| 2,485,452 | 10/1949 | Lyijynen | 425/420 |
| 2,841,826 | 7/1958 | Brucker | 264/319 |
| 2,979,770 | 4/1961 | Greene et al. | 264/319 |
| 3,568,247 | 3/1971 | Lunn | 425/550 |
| 3,694,541 | 9/1972 | Gelin | 264/294 |
| 3,776,998 | 12/1973 | Church | 264/294 |
| 3,809,736 | 5/1974 | Munk | 264/120 |
| 3,809,739 | 5/1974 | Gelin | 264/325 |
| 4,014,970 | 3/1977 | Jahnle | 264/322 |
| 4,327,049 | 4/1982 | Miller | 264/138 |

FOREIGN PATENT DOCUMENTS 1199482  8/1965  Fed. Rep. of Germany .

OTHER PUBLICATIONS

Processing of Plastic Products, pp. 87-89, published in U.S.S.R. (Moscow, 1966), Translation provided.

*Primary Examiner*—Donald Czaja
*Assistant Examiner*—V. Fischbach
*Attorney, Agent, or Firm*—Wenderoth, Lind & Ponack

[57] ABSTRACT

A method for molding plastic materials which release gas during molding by operating a mechanical rotary crank type press having opposed metal die parts respectively carried on a slide driven by a crank mechanism and on a floating plate supported on a die cushion and movable against a bolster on the press. The method involves heating a blank of a plastic material which releases gas during molding to a molding temperature and placing it between the die parts. Then, the crank mechanism of the press is operated to drive the slide in a direction toward a bottom dead center position to a first position which is within a range of positions in the movement of the slide where only the reacting force of the die cushion is received by the blank and holding the slide at this first position for a time up to several seconds for permitting release of the gas from the plastic material of the blank. Then the crank mechanism of the press is further operated to drive the slide to the position thereof corresponding to the bottom dead center position of the crank mechanism for exerting pressure on the blank against the bolster of the press. Finally the slide is driven past the last mentioned position and in the opposite direction to a further position where only the reaction force of the die cushion is received by the blank and holding the blank at this further position for cooling and solidifying the blank.

1 Claim, 6 Drawing Figures

METHOD FOR MOLDING PLASTIC MATERIAL
BY MECHANICAL PRESS

BACKGROUND OF THE INVENTION

1. Field of the Invention

The present invention relates to a method for molding plastic material by a mechanical press.

The principal material which is molded according to the method of this invention is plastic sheet material having a reinforcing agent such as glass fiber or the like mixed therein. The sheet material which is molded therefrom is comprised of glass fiber or the like impregnated with polypropylene or the like, and the material is such that the glass fiber will flow homogeneously during molding. The characteristics of the above material are that there can be molded therefrom shapes which are light in weight, are very strong, are corrosion resistant, have an excellent flow property, have little directionality, have excellent stability with respect to size, and have flexibility in design, making it possible to integrally mold complicated shapes.

In addition to being advantageous for molding the above plastic sheet material having a reinforcing agent, the method of the invention is advantageous for molding of plastic sheet material without any reinforcing agent therein, and the materials molded by this invention include both of these advantages.

2. Description of the Prior Art

In recent times, there has been a tendency to use plastic material mixed with a reinforcing agent therein as a substitute for metal, particularly for automobile parts, e.g. frames for the back seat of an automobile.

In the molding of plastic sheet, an oil pressure press (oilic press) which is easy to control, has been found to be quite suitable because of the need to maintain the molding pressure for a certain length of time after the final shape has been reached. This is due to the phenomenon that when the plastic sheet material is heated for use in pressure molding, the sheet material expands to a thickness several times the thickness of the raw sheet material. Therefore, if it is pressurized rapidly near the lower dead center position of the pressure member of the press, as in the case of a mechanical press, gas within the mold die cannot escape, and, as a result, the surface of the finished piece becomes rough or air bubbles are formed inside the piece by the gas remaining inside, thereby considerably lowering the commercial value of the product.

However, even when an oil pressure press is used, there are disadvantages due to the slow speed of the slide which expedites cooling of the material so that defective or imperfect products are produced or that it is difficult to mold tall or deep products. In order to avoid these disadvantages, increasing the temperature of the sheet material or the temperature of the dies has been tried, but this solution has resulted in deterioration of the material and has affected productivity because the cooling time during molding has to be made longer.

OBJECTS AND BRIEF SUMMARY OF THE INVENTION

The object of the present invention is to fully utilize the high productivity of a mechanical press for molding plastic sheet while overcoming the conventional disadvantages of such a press.

Another object of this invention is to provide in a conventional mechanical press in which a slide is operated by a crank mechanism, a die cushion which acts as a means for stopping the slide in order to let the gas escape during the molding process. The present invention provides a method for molding plastic by using such a press by which it is possible to obtain products with a higher mechanical stability and smoother surface than those molded by a conventional oil pressure press.

These objects are achieved by the method of the present invention for molding plastic materials which release gas during molding by operating a mechanical rotary crank type press having opposed metal die parts respectively carried on a slide driven by a crank mechanism and on a floating plate supported on a die cushion and movable against a bolster on the press. The method comprises: heating a blank of a plastic material which releases gas during molding to a molding temperature and placing it between said die parts; operating the crank mechanism of the press to drive the slide in a direction toward a bottom dead center position to a first position which is within a range of positions in the movement of the slide where only the reaction force of the die cushion is received by the blank and holding the slide at said first position for a time up to several seconds for permitting release of the gas from the plastic material of the blank; further operating the crank mechanism of the press to drive the slide to the position thereof corresponding to the bottom dead center position of the crank mechanism for exerting pressure on the blank against the bolster of the press; and then driving the slide past said lastmentioned position and in the opposite direction to a further position where only the reaction force of the die cushion is received by the blank and holding the blank at said further position for cooling and solidifying the blank.

BRIEF DESCRIPTION OF THE DRAWINGS

The invention will now be described in greater detail in connection with the accompanying drawings, in which.

DETAILED DESCRIPTION OF THE PREFERRED EMBODIMENTS

Figure 1:
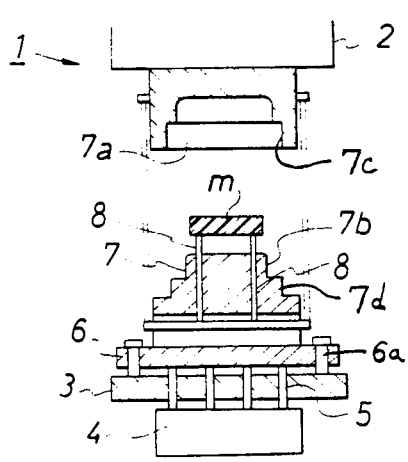
FIGS. 1A to 1D are partial sectional elevation views of a mechanical crank press with the parts in successive positions for carrying out the steps of the molding process according to this invention.
Figure 1:
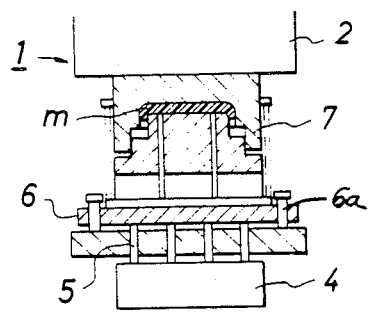
Figure 1:
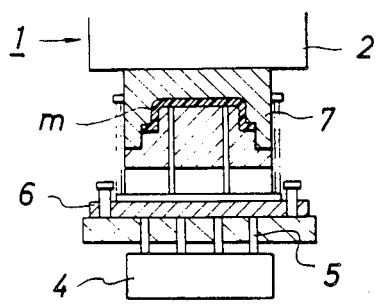
Figure 1:
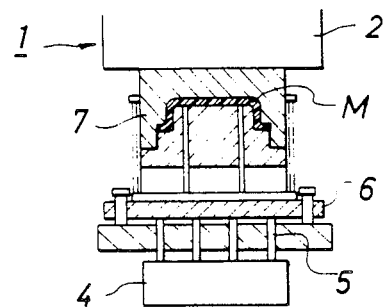
Figure 2:
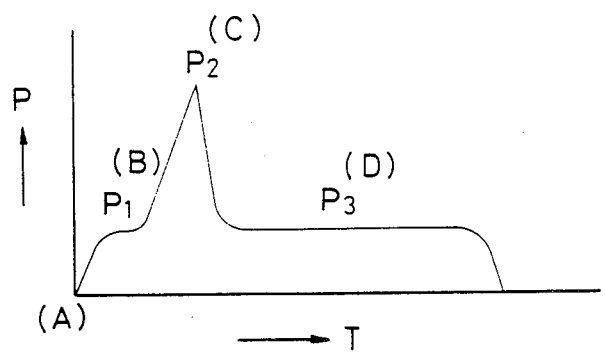
FIG. 2 is a graph showing the change in the pressure and the length of time the pressure is applied during the molding process according to the invention.

The molding method according to the present invention will now be explained with reference to the operation of the press shown in the drawings. The press 1 is a conventional type of mechanical press in which a slide 2 is driven by a crank mechanism or the like (not shown). A die cushion 4 is provided under a bolster 3, and pins 5 on the die cushion 4 extend slidably through bolster 3 and project from the surface thereof. A floating die plate 6 is attached to top ends of the pins 5 and is guided in vertical movement on plate pins 6a. A metal die 7 has a lower metal die 7b thereon, which die 7b in the embodiment shown is a male die. An upper die 7a is fixed to the bottom of the slide 2 opposed to the bottom die 7b on the floating die plate 6, the upper die 7a here being a female die and forming with the male die 7b the metal die 7.

The floating die plate 6 is normally held about 10 mm above the lower dead center position of the slide 2 by the die cushion 4 and is so constructed that it moves slidably up and down with the slide 2 during molding. The construction of the metal die used in the present invention is different from an ordinary press die and an injection mold die. The molding die of this invention requires an edge around the die in order to seal the inside of the die and to prevent the hot blank from flowing out of the die when the pressure is increased. The parts of the metal die 7 must have mating shearing edges 7c and 7d around the periphery in order to seal the inside thereof and prevent the material of a hot blank m from flowing out of the die 7. The standard dimensions of the clearance between these shearing edges 7c and 7d is 0.025–0.05 mm and the depth 10–12 mm.

The metal die 7 is provided with ejector pins 8 to facilitate removal of the molded pieces after the molding process is finished. When designing the die 7, one should take into account the position where the hot blank m is charged, the direction of flow of the plastic sheet of the blank m, and the position of the final release of gas.

The shape of the blank m formed of the plastic sheet material according to this invention is determined by the shape and weight of the piece to be molded, and this is just as important as the determination of the position where it is charged. Basically, a homogeneous molded piece can best be obtained when the amount of flow of material is minimized, which is accomplished by making the shape of the blank m as close to that of the molded piece as possible.

Furthermore, the blank m is supplied to the metal die after being heated to a molding temperature, usually 70°–280° C., the temperature depending on the material. In general, for a mixture of 60 wt. % polypropylene and 40 wt. % glass fiber, the temperature is from 180°–210° C. and the heating time required is 180–240 seconds and it is heated by intermittent or continuous feeding in a heating furnace having several zones. In order to obtain homogeneous molding pieces, it is naturally necessary to conduct uniform heating as well as molding in a predetermined cycle.

Figure 3:
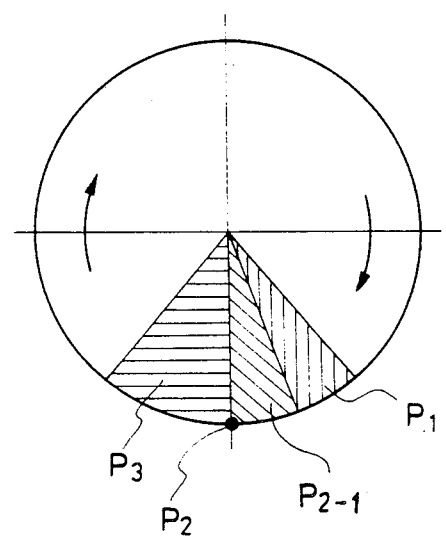
FIG. 3 is a diagram showing the crank angles of the stop positions of the slide of the press of FIGS. 1A–1D.

The steps of pressure molding of a hot blank m by the use of such a press 1 will now be explained with reference to the steps in the press cycle shown in FIGS. 1A–1D. The hot blank m is first charged into the metal die 7, here being shown in FIG. 1A as being placed on the bottom die 7b. The slide 2 is lowered to the position shown in FIG. 1B and stopped, which position is $P_1$ in FIG. 3. At this position this floating die plate 6 is supported on pins 5 above bolster 3, which is within the range where only the reaction force of the die cushion 4, before the crank reaches its lower dead center $P_2$, is received by the blank. The time during which the slide 2 is stopped is determined according to the type of product to be molded, but generally it is less than 3 seconds. The position at which it is best for the slide 2 to stop is a position within the range at which the blank m is subjected only to the reaction force of the die cushion 4. The molding pressure at this point for the above described material is about 10–50% of that at the lower dead center position $P_2$ of the crank, and gas is released from the blank m while the slide 2 is stopped.

The time for which the slide 2 is stopped should be longer than is necessary for releasing the gas. If it becomes too long, the blank m cools too much and the subsequent molding is adversely affected. Therefore, it is important to determine precisely the length of time for which the slide 2 is stopped.

The press 1 is then operated again to drive the slide 2 by the crank passing through the lower dead center position $P_2$, at which the mold parts are in the positions shown in FIG. 1C, and the slide 2 is stopped once again at the crank position $P_3$ with the mold parts in the positions shown in FIG. 1D, which is again within the range in which the blank m is subject only to the reaction force of the die cushion 4. When the slide 2 passes the lower dead center position, the floating die plate 6 engages the bolster 3, so that, regardless of the reaction force of the die cushion 4, the blank m is pressed by the full pressure of the press 1 and the material is molded so as to fill the space between the parts 7a and 7b of the metal die 7. The stop position $P_3$ can be anywhere if it is within the range where the reaction force of the die cushion 4 is received by the blank m after the crank has passed the lower dead center position $P_2$. During the time the slide 2 is stopped with the crank at position $P_3$, a molded product M is solidified by cooling while being maintained in a pressurized state. The proper pressure if from 10–50% of the full molding pressure, as is the pressure during release of gas. After the cooling and solidification of the molded product m, the press 1 is operated again and the slide 2 is stopped at the upper dead center position of the crank and the molded product M is ejected by ejector pins 8 in the conventional manner.

With respect to the range of positions within which the slide 2 is to be stopped at the above-described positions $P_1$ and $P_3$, the so-called "sticking phenomenon" in the crank type press 1, in which the upper die 7a becomes stuck in the lower die 7b, occurs when the slide 2 is stopped at a position in the range $P_{2-1}$ immediately before the lower dead center position of the crank. Therefore, it is necessary to stop the slide 2 just before this critical range when the crank of the press 1 is used as the force moving the slide 2 after the gas release step. But for the cooling and solidification, any arbitrary position is acceptable as long as it is after the slide 2 has passed the lower dead center position and is within the range of positions where the reaction force of only the die cushion 4 is received. In addition, the above-described range where it is dangerous to stop the crank, cannot be determined by the capacity of the press 1 alone, but it must be determined depending on the actual operational conditions. This is so because, when the press 1 is operated at a pressure close to the maximum capacity of the press 1, it is necessary to widen the no-stop range of the slide 2, whereas when the press 1 is operated below the maximum capacity of the press 1, the above-described no-stop range can be made narrower.

As explained above, this invention permits complete release of gas from plastic sheet material being molded in the pressure molding method, and makes possible manufacture of molded products m which are free of air bubbles, and which have a very smooth surface, thus improving the strength of the molded products.

EXAMPLE

A blank m is formed of a plastic sheet material constituted by 60 wt. % polypropylene and 40 wt. % glass fiber having a fiber size 34 and having a weight of 1.19 gm/cc. The blank m was 250 cm by (gm/1,000 m) 300 cm 3.7 cm thick. The blank m was heated to a molding temperature of 180°–210° C. for a time of 180–240 sec. The heated blank m was placed on a bottom die 7b of a rotary crank type press 1, as shown in FIGS. 1A-1D with a capacity of 300 tons. The crank was rotated to a position 5° ahead of the lower dead center position where the pressure on the blank was from 75–130 Kg/cm$^2$ and held there for a time up to 2 sec. Thereafter, the crank was rotated through the bottom dead center position for exerting on the blank m a pressure of 250–320 Kg/cm$^2$ and was then stopped at a position about 5° past the lower dead center position for a time of from 10 to 30 sec. Thereafter, the thus molded product M was ejected from the press 1.

What is claimed is:

1. A method for molding plastic materials which release gas during molding by operating a mechanical rotary crank type press having opposed metal die parts respectively carried on a slide driven by a crank mechanism and on a floating die plate supported on a die cushion and movable against a bolster on the press, said method comprising:

pre-heating a blank of a thermoplastic material containing glass fiber reinforcement, which thermoplastic material releases gas during molding to a molding temperature in the range from 70° to 280° C.;

placing the blank between said metal die parts;

operating the crank mechanism of the press to drive the slide in a direction toward a bottom dead center position to a first position at which the pressure applied to the blank is from 10 to 50% of the pressure applied at the position corresponding to the bottom dead center position of the crank mechanism, said first position being within a range of positions in the movement of the slide where only the reaction force of the die cushion is received by the blank;

holding the slide at said first position for a time from a fraction of a second up to three seconds for permitting release of the gas from the thermoplastic material of the blank;

further operating the crank mechanism of the press to drive the slide to the position thereof corresponding to the bottom dead center position of the crank mechanism;

exerting pressure on the blank against the bolster of the press;

then driving the slide from said last-mentioned position in the opposite direction to a further position where only the reaction force of the die cushion is received by the blank; and holding the blank for a time from 5 to 40 seconds at said further position for cooling and solidifying the blank, whereby the so-called "sticking phenomenon" of the slide is avoided and the blank is molded into a product free of air bubbles, with a very smooth surface, and with improved strength.

* * * * *

UNITED STATES PATENT AND TRADEMARK OFFICE
CERTIFICATE OF CORRECTION

PATENT NO. : 4,489,031

DATED : December 18, 1984

INVENTOR(S) : OGIHARA

It is certified that error appears in the above-identified patent and that said Letters Patent is hereby corrected as shown below:

On the title page;

The name of the assignee which is currently given as Susumu Ogihara should be identified as Aida Engineering, Ltd.

Signed and Sealed this

First Day of October 1985

[SEAL]

Attest:

DONALD J. QUIGG

*Attesting Officer*

*Commissioner of Patents and Trademarks—Designate*